US009000779B2

(12) United States Patent
Caron et al.

(10) Patent No.: US 9,000,779 B2
(45) Date of Patent: Apr. 7, 2015

(54) METHOD OF CORRECTING THE GAIN OF A CAPACITIVE MEMBER, AND A DEVICE FOR IMPLEMENTING THE METHOD

(75) Inventors: Jean-Michel Caron, Paris (FR); Vincent Ragot, Paris (FR)

(73) Assignee: Sagem Defense Securite, Paris (FR)

( * ) Notice: Subject to any disclaimer, the term of this patent is extended or adjusted under 35 U.S.C. 154(b) by 741 days.

(21) Appl. No.: 12/745,065

(22) PCT Filed: Dec. 19, 2008

(86) PCT No.: PCT/FR2008/001791

§ 371 (c)(1), (2), (4) Date: May 27, 2010

(87) PCT Pub. No.: WO2009/103900

PCT Pub. Date: Aug. 27, 2009

(65) Prior Publication Data

US 2010/0326166 A1 Dec. 30, 2010

(30) Foreign Application Priority Data

Dec. 19, 2007 (FR) ..................................... 07 08907

(51) Int. Cl.

| | |
|---|---|
| ***G01R 27/26*** | (2006.01) |
| ***G01P 15/00*** | (2006.01) |
| ***G01L 9/12*** | (2006.01) |
| ***G01C 19/5691*** | (2012.01) |
| ***G01C 25/00*** | (2006.01) |

(52) U.S. Cl.
CPC .......... *G01C 19/5691* (2013.01); *G01C 25/005* (2013.01)

(58) Field of Classification Search
CPC .......................... G01C 25/005; G01C 19/5691
USPC ............... 324/637, 658–690; 73/514.18–517, 73/724, 1.37, 1.77, 504.12, 504.14
See application file for complete search history.

(56) References Cited

U.S. PATENT DOCUMENTS

| | | | | |
|---|---|---|---|---|
| 5,440,939 | A | 8/1995 | Barny et al. | |
| 5,594,534 | A * | 1/1997 | Genovese | 399/285 |
| 6,035,694 | A | 3/2000 | Dupuie et al. | |
| 6,668,614 | B2 * | 12/2003 | Itakura | 73/1.38 |
| 6,992,492 | B2 * | 1/2006 | Burdick et al. | 324/658 |
| 7,456,731 | B2 * | 11/2008 | Umemura et al. | 340/436 |
| 2003/0006783 | A1 * | 1/2003 | Min et al. | 324/676 |
| 2006/0150735 | A1 * | 7/2006 | Fax et al. | 73/514.18 |
| 2007/0028686 | A1 * | 2/2007 | Wyse et al. | 73/504.12 |

FOREIGN PATENT DOCUMENTS

| | | |
|---|---|---|
| WO | WO2006/074119 | 7/2006 |

* cited by examiner

*Primary Examiner* — Melissa Koval
*Assistant Examiner* — Farhana Hoque
(74) *Attorney, Agent, or Firm* — Muncy, Geissler, Olds & Lowe, P.C.

(57) ABSTRACT

A method of correcting the gain of a capacitive member having electrodes that are movable relative to each other including the steps of successively applying to one of the electrodes, reduced bias voltages having opposite signs and a common value below a threshold for which a remanent field generated by said reduced bias voltages can be measured, making corresponding measurements of the output signals from the capacitive member; taking an average, and correcting the gain of the capacitive member as a function of the measured output signal.

12 Claims, 3 Drawing Sheets

METHOD OF CORRECTING THE GAIN OF A CAPACITIVE MEMBER, AND A DEVICE FOR IMPLEMENTING THE METHOD

The present invention relates to a method of correcting the gain of a capacitive member and to a device for implementing the method.

BACKGROUND OF THE INVENTION

Numerous devices are known that include a capacitive member for detecting or controlling the distance between two portions of the device that are movable relative to each other. In particular, it is known that capacitive members are used for detecting and controlling deformation of a mechanical resonator in a vibrating gyro, in particular an axisymmetric vibrating gyro. When such devices are used in free gyro mode, they present the advantage of having a scale factor (Bryan's factor) of very great stability.

In free gyro mode, the vibration is free and its plane turns about the axis of the resonator as a function of the movements of the carrier. To benefit from the advantages of this mode, it is essential to know accurately the position of the vibration relative to the housing of the apparatus in order to apply control signals that enable the vibration movement to be sustained. Any error in measuring the position of the vibration creates an error in the direction of the applied force and thus generates parasitic drift of the gyro.

Numerous attempts have been made to correct or take account of errors that occur in accelerometer measurements. Thus, documents US-A-2003/006783 and U.S. Pat. No. 6,035,694 seek to attenuate measurement error caused by stray capacitances that are substantially constant. Document U.S. Pat. No. 6,035,694 describes a similar solution.

OBJECT OF THE INVENTION

Operation of the gyro, both in terms of detection and in terms of control, involves the gain of the capacitive member, i.e. the ratio between the distance between the electrodes of the capacitive member to the amplitude of the electrical signal at the terminals of the capacitive member. The amplitude of the signal at the terminals of the capacitive member when it is used as a detector and the distance between the electrodes when it is used for control purposes are also a function of a direct current (DC) bias voltage applied to one of the electrodes. Experiments leading to the invention have shown that the gain of the capacitive member is influenced by a remanent field that remains even after the bias voltage has been interrupted. It is believed that this remanent field results from impurities in the bulk or on the surface of the electrodes, and that it is generated by the bias voltage when it is applied. When the nominal bias voltage, i.e. the voltage applied to the capacitive member during a detection or control stage, is of the order of several hundreds of volts, typically lying in the range 200 volts to 400 volts, the resulting remanent field is equivalent to a bias voltage of a few volts. This remanent field may generate a slowly-varying gain error.

An object of the invention is to propose a method and a device enabling the effects of the remanent field to be eliminated.

SUMMARY OF THE INVENTION

In order to achieve this object, the invention provides a method of correcting the gain of a capacitive member comprising electrodes that are movable relative to each other and between which a remanent field is established, the method comprising the steps of:

- applying to one of the electrodes a reduced DC bias voltage having a value that is below a threshold for which a remanent field generated by said reduced bias voltage can be measured;
- measuring an output signal from the capacitive member; and
- correcting the gain of the capacitive member as a function of the measured output signal.

The output signal from the capacitive member then comprises two components that add: a first component results from a bias voltage that is equivalent to the remanent field that is present, and a second component that results directly from the reduced bias voltage. The component of the output signal resulting directly from the reduced bias voltage can be calculated from said bias voltage and from the gain of the capacitive member prior to correction. The component of the output signal resulting from the remanent field can therefore be extracted from the output signal. This component makes it possible to calculate the gain error caused by the remanent field while the capacitive member is in use for operation of the device with which it is associated.

In an advantageous version of the invention, the reduced bias voltage is greater than an estimated bias voltage equivalent to the remanent field. Thus, the output signal from the capacitive member has a sign that is constant regardless of the direction of the remanent field and the absolute value of the output signal then makes it possible to determine the direction of the remanent field depending on whether said absolute value is greater than or less than the amplitude of the reduced bias voltage.

Preferably, the method includes steps of performing two successive measurements of the output signal from reduced bias voltages having the same value but having opposite signs, and taking an average of the resulting output signals. This eliminates components from the output signal that result from the reduced bias voltages, thus making it possible to use the average of the output signals from the capacitive member to correct gain without it being necessary to take account of the amplitude of the reduced bias signals.

In a preferred implementation of the method of the invention, the method includes a prior step of applying a nominal bias signal to the capacitive member for a short time. This ensures that the remanent field measured while implementing the gain correction method has a value that is identical to its value during operation of the device with which the capacitive member is associated.

BRIEF DESCRIPTION OF THE DRAWINGS

Other characteristics and advantages of the invention appear on reading the following description of a particular, non-limiting implementation of the invention, given with reference to the accompanying figures, in which.

DETAILED DESCRIPTION OF THE INVENTION

Figure 1:
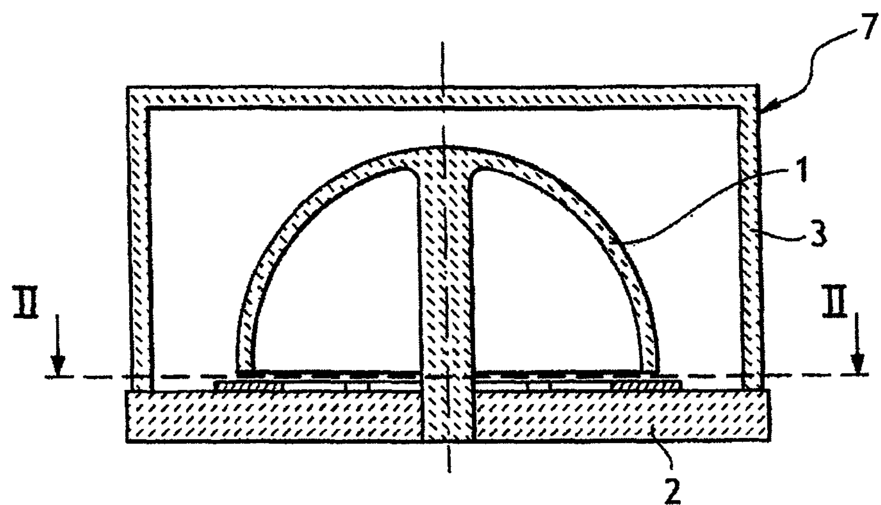
FIG. 1 is a diagrammatic axial section view on I-I of FIG. 2 showing a hemispherical-bell vibrating sensor.
Figure 2:
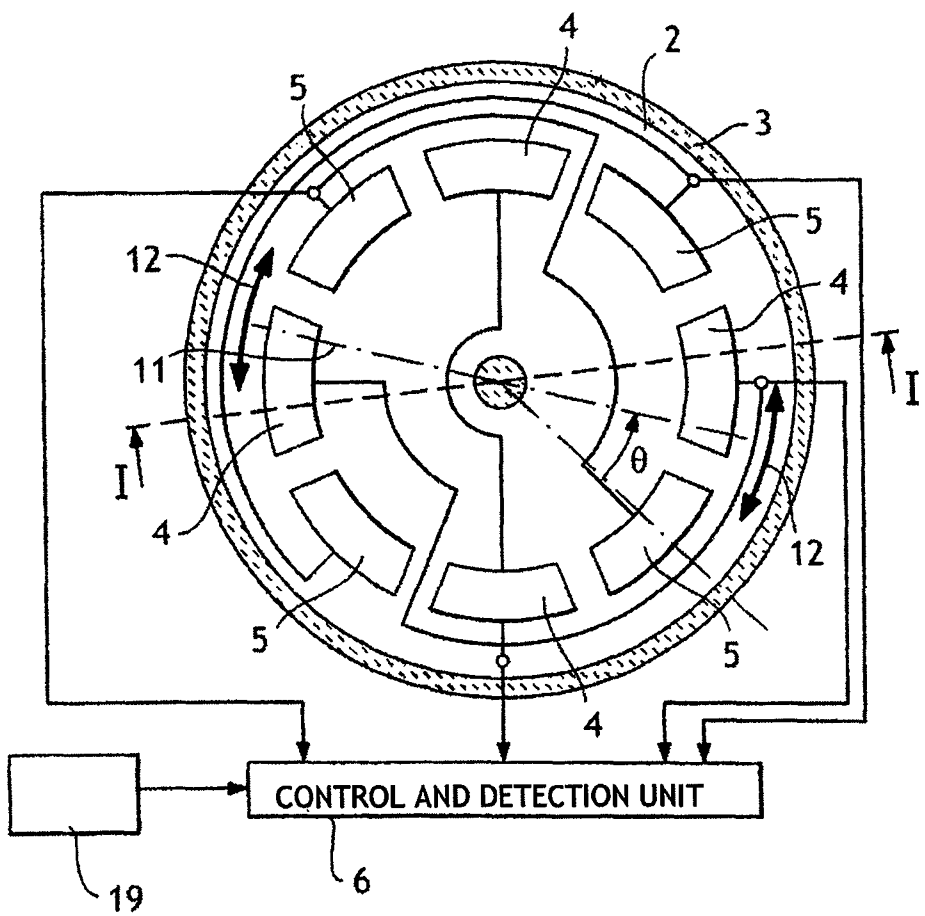
FIG. 2 is a section view on line II-II of FIG. 1.

With reference to FIGS. 1 and 2, the invention is illustrated with reference to a hemispherical-bell vibrating sensor 7 comprising, in conventional manner, a silica bell 1 mounted on a base 2 that is likewise made of silica, the bell 1 being surrounded by a gastight housing 3 enabling the sensor to be placed in a vacuum.

Likewise in known manner, the inside surface of the bell 1 is metal-plated, as is its bottom edge, and the bottom edge extends facing two pairs of control electrodes 4 and two pairs of detection electrodes 5. The metal-plated bottom edge of the bell 1 with each of the facing electrodes form respective capacitive members suitably connected to a control and detection unit 6 for generating vibration contained in a plane containing the axis of the hemispherical bell and of position that is identified by an angle θ relative to a reference electrode 5. The position of the vibration is controlled by the control unit 6 by applying precession control to the control electrodes 4.

The remanent field that results from applying the DC bias voltage to the metal layer of the bell 1 varies not only as a function of time and temperature, but also as a function of the orientation of the plane containing the vibration.

In order to perform updated correction of the gain of each capacitive member, the method of the invention preferably includes an initialization stage that is implemented periodically, where the period is a function of the length of time the remanent field is retained after interrupting the nominal bias voltage. This retention time may be a few hours to a few days. A stage of applying a correction is then implemented on using the device with which the capacitive member is associated.

The initialization stage is preferably performed immediately before performing the stage of applying the correction, e.g. immediately before the takeoff of an airplane on which the vibrating sensor is mounted.

Figure 3:
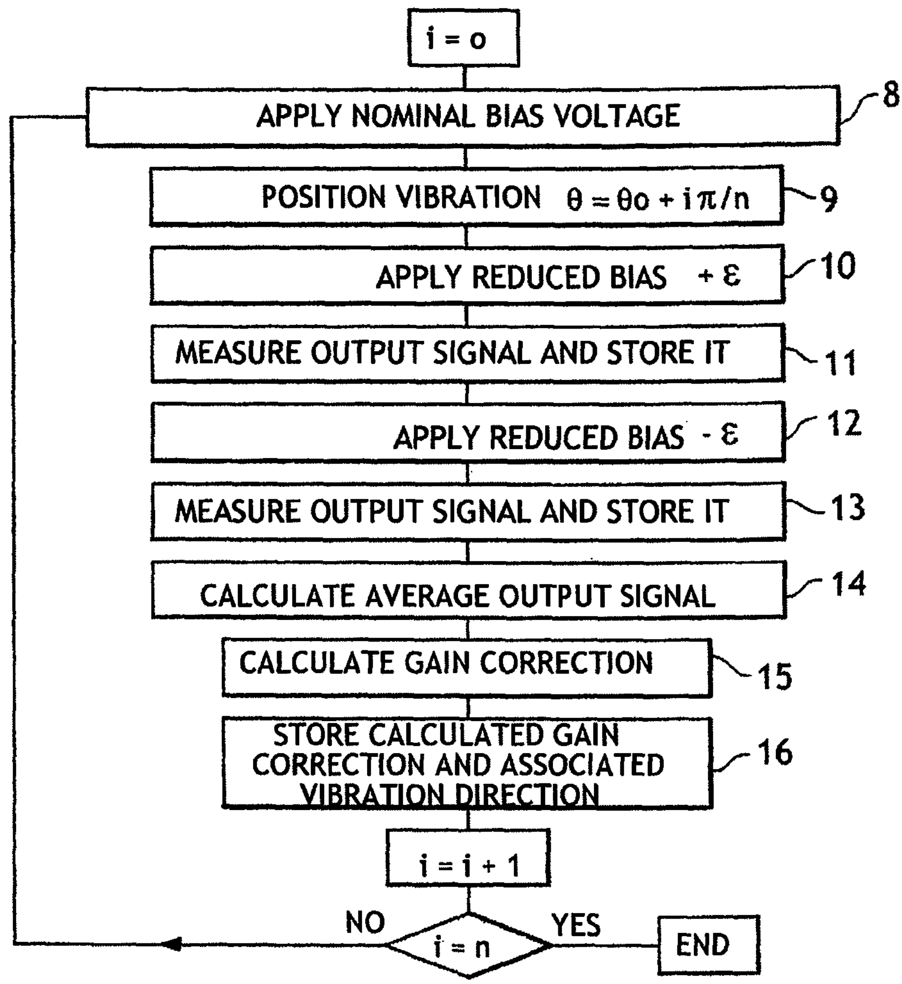
FIG. 3 is a flow chart illustrating an implementation of the method of the invention in an initialization stage.

FIG. 3 shows a preferred implementation of the initialization stage. In this preferred implementation the method comprises a step 8 of applying the nominal bias voltage for a short period, i.e. the bias voltage that is applied while the gyro is in use. In most usual circumstances, the nominal bias voltage lies in the range 200 volts to 400 volts. The method then includes a step 9 of positioning the vibration, initially at an angle $\theta_0$ relative to the reference electrode. In this position, the method includes a step 10 of applying a reduced DC bias voltage having a value +ϵ that is below a threshold at which it is possible to measure a remanent field generated by said reduced bias voltage. The value +ϵ of the reduced bias voltage is also greater than the bias voltage VE that is equivalent to the remanent field. In this context, it should be observed that a nominal bias voltage of 200 volts to 400 volts generates a remanent field having an equivalent bias voltage of the order of a few volts. The reduced bias voltage ϵ may thus itself be of the order of a few volts, while being greater than the voltage that is equivalent to the remanent field.

The equivalent bias voltage VE may be estimated from technical data of the capacitive member. This equivalent bias voltage may also be estimated by measuring the output signal without applying a reduced bias voltage. In practice, the value of the reduced bias voltage may be set arbitrarily at 10 volts.

In contrast, because of its low value, the reduced bias voltage generates a remanent field of negligible value (equivalent to a bias voltage of the order of a few hundredths of a volt). The component of the output signal corresponding to the remanent field thus results solely from the remanent field generated by the initial application of the nominal bias voltage.

Figure 5:
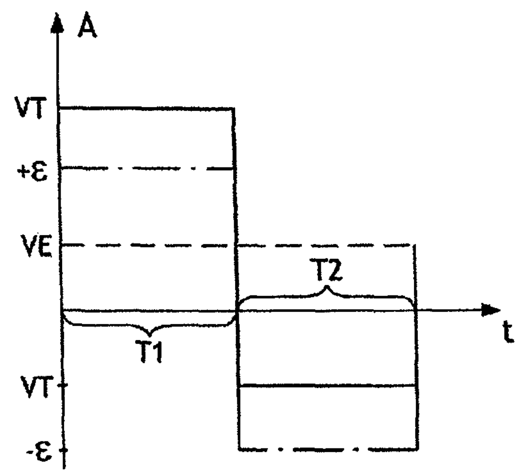
FIG. 5 is a diagram showing the amplitude of the bias voltage equivalent to the remanent field, the reduced bias voltage, and the total equivalent voltage obtained for two same-value reduced bias voltages having opposite signs.

While the reduced bias voltage +ϵ is being applied, a step 11 is performed of measuring the output signal and storing it. The output signal from the capacitive member is the result of modulation by the gap between the electrodes of the total bias voltage VT that, as shown in FIG. 5, is the algebraic sum of the bias voltage VE equivalent to the remanent field present plus the reduced bias voltage +ϵ. The output signal is measured during a time period T1.

In the preferred implementation shown in FIG. 3, the method also includes a step 12 of applying a reduced DC bias voltage of −ϵ, i.e. a bias voltage having the same value as the reduced bias voltage +ϵ, but of opposite sign. A step 13 is then performed of said measuring the corresponding output signal during a time period T2 that is equal to the time period T1.

The average of the output signal over the time period T1+T2 is then calculated in a step 14. The components of the output signal corresponding to the reduced bias voltage +ϵ and to the reduced bias voltage −ϵ thus cancel so the average is representative of the remanent field on its own. The average as calculated in this way can thus be used directly for calculating the gain correction in a step 15. The gain correction as calculated in this way and the associated position of the vibration are stored, as represented by step 16 in FIG. 3.

As also shown in FIG. 3, these steps are repeated for n positions of the vibration at angular offsets of π/n, where n is determined as a function of the fineness of the correction it is desired to perform.

Figure 4:
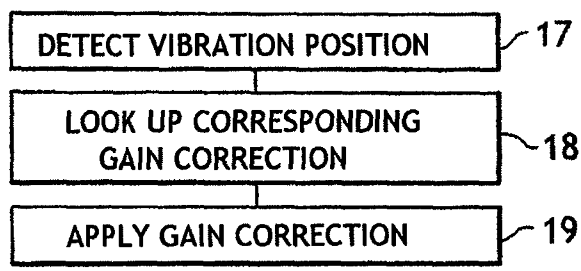
FIG. 4 is a flow chart illustrating a first implementation of the method of the invention in an operating stage of the device with which the capacitive member is associated.

During a stage of using the gyro, as shown in FIG. 4, the method comprises a first step 17 of detecting the position of the vibration, followed by a step 18 of searching for the corresponding gain correction, and then a step 19 of applying the gain correction. When the position of the vibration is in a position that is intermediate between two positions for which gain corrections are stored, it is possible either to apply the gain correction for the closer of the stored positions, or else to take the average of the gain corrections associated with two stored positions on either side of the vibration position.

Figure 6:
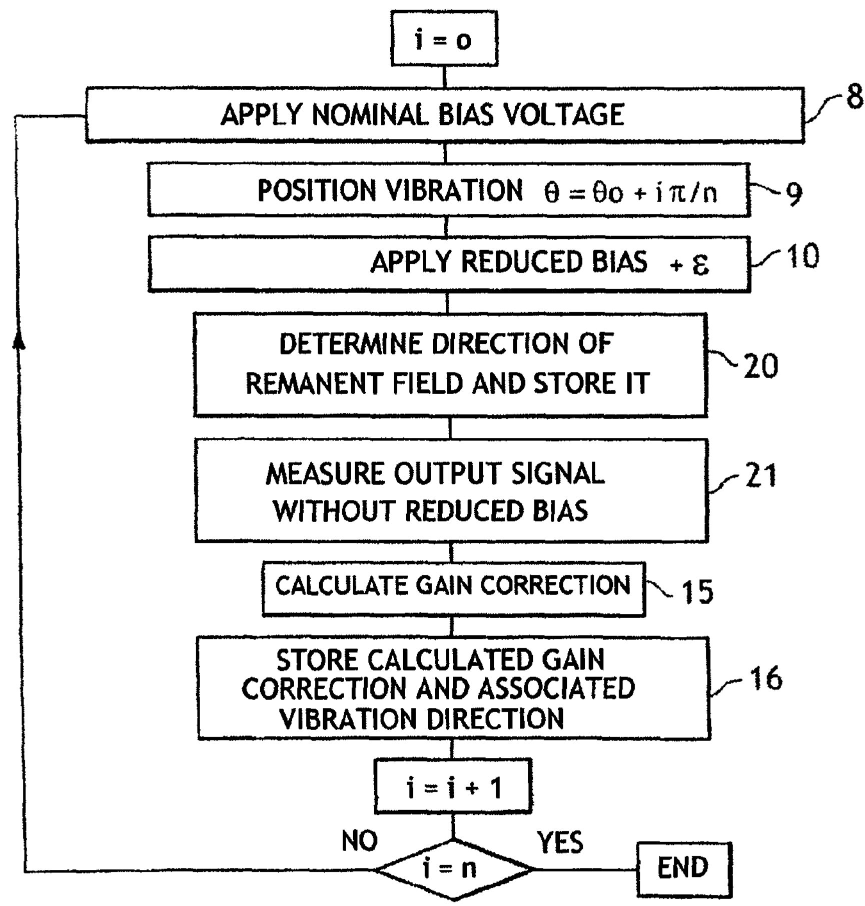
FIG. 6 is a flow chart illustrating a second implementation of the method of the invention in an operating stage of the device with which the capacitive member is associated.

With reference to FIG. 6, in the second implementation of the method of the invention, this implementation, like the first implementation, has a first step 8 of applying the nominal bias voltage for a short time followed by a step 9 of positioning the vibration, and a step 10 of applying a reduced bias voltage +ϵ. In this implementation, the reduced bias voltage is greater than the estimated bias voltage VE equivalent to the remanent field. The output signal from the capacitive member 11 is measured in this implementation, in a step 20, to determine the direction only of the remanent field and to store said direction. This step of determining the direction of the remanent field is followed by a step 21 of measuring the output signal from the capacitive member without applying a reduced bias voltage. The step 15 of calculating the gain correction is then performed using firstly the direction of the remanent field in order to determine the sign of the correction, and secondly by using the measured output signal without reduced bias in order to determine the value of the gain correction. The gain correction and the associated vibration position are stored in a step 16 as before.

In a variant of this second implementation of the method of the invention, the value of the remanent field may be determined by measuring the output signal from the capacitive member while maintaining the reduced bias. To obtain the correction value for compensating the remanent field, it is then necessary to subtract the component of the output signal that results directly from the reduced bias voltage from the measured output signal by calculating said component from the bias voltage and the gain of the capacitive member prior to correction. Nevertheless, it should be observed that generation of the reduced bias voltage suffers from an error that gives rise to a correspondingly erroneous determination of the component resulting from the remanent field. As shown in FIG. 6, it is therefore preferable to determine the direction of the remanent field by applying a reduced bias voltage, and to measure the value of the remanent field independently by measuring the output signal without the reduced bias voltage. In this context, it should be observed that the steps of determining the direction of the remanent field and of measuring the value of the remanent field may be performed in either order.

Naturally, the invention is not limited to the implementation described, and variants may be applied thereto without going beyond the ambit of the invention as defined by the claims.

In particular, although the invention is described with reference to an axisymmetric vibrating gyro having a plurality of capacitive members, the invention is equally applicable to a device having a single capacitive member for which it is desired to correct gain.

What is claimed is:

1. A method of correcting the gain of a capacitive member comprising electrodes that are movable relative to each other, with a remanent field established between the electrodes, for detecting and controlling deformation of a mechanical resonator in a vibrating gyro, wherein the method comprises the steps of: applying a reduced DC bias voltage to one of the electrodes, the voltage having a value below a threshold for which a remanent field generated by said reduced bias voltage can't be measured; measuring an output signal from the capacitive member; and calculating a correction for the gain of the capacitive member as a function of the measured output signal, thereby detecting the deformation of the mechanical resonator.

2. The method according to claim 1, wherein the reduced bias voltage is greater than an estimated bias voltage (VE) equivalent to the remanent field.

3. The method according to claim 2, wherein the calculation of the gain correction comprises a step of determining the direction of the remanent field from a measurement of the output signal from the capacitive member while a reduced bias voltage is being applied, and a step of determining the value of the remanent field from a measurement of the output signal from the capacitive member while no reduced bias voltage is being applied.

4. The method according to claim 2, wherein the calculation of the gain correction includes the step of subtracting a component that results directly from the reduced bias voltage from the output signal.

5. The method according to claim 1, including steps of performing two successive measurements of the output signal for reduced bias voltages having the same values but opposite signs, and taking the average of the resulting output signals.

6. The method according to claim 1, including a prior step) of applying a nominal bias voltage.

7. The method according to claim 1, including an initialization and gain correction storage stage, followed by a stage of applying the correction.

8. The method according to claim 7, used with a capacitive member incorporated in an axisymmetric vibrating gyro generating vibration that can be moved into various positions, wherein the gain corrections are performed at a plurality of vibration positions.

9. A control method for a sensor having a capacitive member comprising electrodes that are movable relative to each other, the method comprising:

a measuring stage during which a nominal bias voltage is applied to the electrodes;

an initialization stage during which the method of correcting the gain of claim 1 is implemented, the value of the reduced DC bias voltage being below a value of the nominal bias voltage and the gain correction calculated with said method being used during the measuring stage.

10. A method according to claim 9, wherein the initialization stage is implemented periodically, where the period is a function of a length of time the remanent field is retained after interrupting the nominal bias voltage.

11. A device for correcting the gain of a capacitive member comprising electrodes that are movable relative to each other, for detecting and controlling deformation of a mechanical resonator in a vibrating gyro; and means for applying a bias signal to one of the electrodes, wherein the device includes means for applying a reduced DC bias voltage to one of the electrodes at a value that is below a threshold for which a remanent field generated by said reduced bias voltage can be measured, means for measuring an output signal from the capacitive member, and means for correcting the gain of the capacitive member as a function of the measured output signal, thereby detecting the deformation of the mechanical resonator.

12. The device according to claim 11, that is incorporated in an axisymmetric vibrating gyro that generates vibration that can be taken to various positions, the device including means for storing gain corrections for a plurality of vibration positions.

* * * * *